US006951903B2

(12) United States Patent
Eichenauer

(10) Patent No.: US 6,951,903 B2
(45) Date of Patent: *Oct. 4, 2005

(54) ABS COMPOSITIONS WITH IMPROVED PROPERTY COMBINATIONS

(75) Inventor: Herbert Eichenauer, Dormagen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 36 days.

This patent is subject to a terminal disclaimer.

(21) Appl. No.: 10/242,992

(22) Filed: Sep. 13, 2002

(65) Prior Publication Data

US 2003/0119986 A1 Jun. 26, 2003

(30) Foreign Application Priority Data

Sep. 17, 2001 (DE) ........................................ 101 45 775

(51) Int. Cl.[7] ........................... C08L 25/12; C08L 55/02

(52) U.S. Cl. ............................ 525/66; 525/67; 525/71; 526/219.6

(58) Field of Search ............................ 525/66, 67, 71; 526/219.6

(56) References Cited

U.S. PATENT DOCUMENTS

| | | | | |
|---|---|---|---|---|
| 4,430,478 A | | 2/1984 | Schmitt et al. | 525/71 |
| 4,713,420 A | | 12/1987 | Henton | 525/236 |
| 4,874,815 A | | 10/1989 | Bubeck et al. | 525/71 |
| 5,041,498 A | | 8/1991 | Hare et al. | 525/71 |
| 5,270,387 A | | 12/1993 | Sheilds et al. | 525/71 |
| 5,883,190 A | | 3/1999 | Eichenauer | 525/71 |
| 6,596,811 B1 | * | 7/2003 | Barghoorn et al. | 525/63 |
| 6,727,319 B2 | * | 4/2004 | Eichenauer | 525/66 |

FOREIGN PATENT DOCUMENTS

| | | |
|---|---|---|
| DE | 100 08 419 | 8/2001 |
| DE | 100 08 420 | 8/2001 |
| EP | 0 390 781 | 3/1996 |
| WO | 89/05836 | 6/1989 |

* cited by examiner

*Primary Examiner*—James J. Seidleck
*Assistant Examiner*—Olga Asinovsky
(74) *Attorney, Agent, or Firm*—Godfried R. Akorli; Jill Denesvich

(57) ABSTRACT

A thermoplastic molding composition that features a combination of extremely good toughness, good processability, adjustable surface gloss, good inherent color and reduced opacity is disclosed. The composition contains A) a graft rubber that is the product of free-radical emulsion polymerization using a peroxodisulfate initiator, B) a graft rubber that is the product of free-radical emulsion polymerization using an azo compound initiator and C) a graft polymer that is the product of solution, bulk or suspension polymerization.

23 Claims, No Drawings

ABS COMPOSITIONS WITH IMPROVED PROPERTY COMBINATIONS

FIELD OF THE INVENTION

The present invention relates to thermoplastic molding compositions and more particularly to compositions containing ABS.

SUMMARY OF THE INVENTION

A thermoplastic molding composition that features a combination of extremely good toughness, good processability, adjustable surface gloss, good inherent color and reduced opacity is disclosed. The composition contains A) a graft rubber that is the product of free-radical emulsion polymerization using a peroxodisulfate initiator, B) a graft rubber that is the product of free-radical emulsion polymerization using an azo compound initiator and C) a graft polymer that is the product of solution, bulk or suspension polymerization.

BACKGROUND OF THE INVENTION

ABS molding compositions have been used over many years in large amounts for the production of all types of molded parts. The property spectrum of these thermoplastic resins ranges from relatively brittle to extremely tough.

A special area of use of ABS molding compositions is the production of molded parts that have to meet stringent requirements as regards impact toughness as well as the possibility of targeted adjustment (gradations between glossy and matte) of the surface gloss, for example in the automobile sector or for the production of housing parts.

ABS products with high toughness values and relatively high surface gloss may be produced using conventional ABS and employing large amounts of rubber; this is associated however with disadvantages as regards other properties, for example modulus of elasticity, heat stability and thermoplastic flowability.

ABS products with relatively low surface gloss can be obtained for example by solution polymerization or bulk polymerization processes; however products with high low-temperature strengths are not obtained by these processes.

Although it is true that certain improvements may be achieved by mixing conventional emulsion-ABS types with solution-ABS or bulk-ABS types (see for example U.S. Pat. No. 4,430,478), the stringent requirements as regards toughness and flowability while at the same time preserving the low surface gloss that is characteristic of bulk-ABS are however not met by these materials.

It is also known to mix ABS polymers produced by bulk polymerization with various graft rubber polymers having small and large particle sizes produced by emulsion polymerization (see for example U.S. Pat. No. 4,430,478, U.S. Pat. No. 4,713,420, EP-A 190 884, EP-A 390 781, EP-A 436 381 and the literature cited therein), though the resulting products do not have an improved toughness at low-temperatures.

EP-A 845 497 describes a mixture of ABS polymer obtained by bulk or suspension polymerization and a special graft rubber obtained by emulsion polymerization using two rubber components. The toughness of the molding compositions produced therefrom is however often not sufficient for the production of molded parts subjected to extreme stresses.

All these ABS polymers have, apart from the aforementioned mechanical disadvantages, a non-optimal pigmentability on account of the excessively high opacity and insufficient inherent color, as a result of which increased amounts of pigments are required to pigment the molding compositions and in addition the toughness is thereby negatively affected.

It has now been found that by a combination of at least two graft rubbers specially produced by emulsion polymerization with at least one graft polymer produced by solution, bulk or suspension polymerization, products can be obtained having a combination of very good toughness, good processability, adjustable surface gloss, good inherent color and reduced opacity.

DETAILED DESCRIPTION OF THE INVENTION

The present invention accordingly provides compositions containing

A) at least one graft rubber produced by free-radical emulsion polymerization of at least one vinyl monomer, preferably of styrene and acrylonitrile in a weight ratio of 90:10 to 50:50 therebetween, wherein the styrene and/or acrylonitrile may be wholly or partially replaced by α-methylstyrene, methyl methacrylate or N-phenylmaleimide, particularly preferably of styrene and acrylonitrile in the presence of at least one rubber a) present in latex form having a glass transition temperature below 0° C., preferably in the presence of a butadiene rubber, particularly preferably polybutadiene, using at least one peroxodisulfate compound as initiator, B) at least one graft rubber produced by free-radical emulsion polymerization of at least one vinyl monomer, preferably of styrene and acrylonitrile in a weight ratio of 90:10 to 50:50 therebetween, wherein the styrene and/or acrylonitrile may be wholly or partially replaced by α-methylstyrene, methyl methacrylate or N-phenylmaleimide, particularly preferably of styrene and acrylonitrile in the presence of at least one rubber b) present in latex form having a glass transition temperature below 0° C., preferably in the presence of a butadiene rubber, particularly preferably polybutadiene, using at least one suitable azo compound as initiator, and C) at least one graft polymer that is obtained by solution, bulk or suspension polymerization of styrene and acrylonitrile in a weight ratio of 90:10 to 50:50 therebetween, wherein the styrene and/or acrylonitrile may be wholly or partially replaced by α-methylstyrene, methyl methacrylate or N-phenylmaleimide, in the presence of a rubber, wherein the rubber contains in copolymerized form 0 to 50 wt. % of a further vinyl monomer and wherein the weight ratio of the monomers polymerized to form the grafted phase to rubber is 50:50 to 97:3, preferably 70:30 to 95:5.

Preferred compositions according to the invention contain a total amount of graft rubbers A) and B) that are produced by free-radical emulsion polymerization of 1 to 50 parts by weight, preferably 2.5 to 45 parts by weight and particularly preferably 5 to 40 parts by weight and 50 to 99 parts by weight, preferably 55 to 97.5 parts by weight and particularly preferably 60 to 95 parts by weight of graft polymer C).

The graft rubbers A) and B) produced by free-radical emulsion polymerization may be contained in 1) in any proportion therebetween, normally in the range 5 to 95 parts by weight A) and 95 to 5 parts by weight B); preferred amounts are 20 to 90 parts by weight A) and 10 to 80 parts by weight B), particularly preferably 30 to 80 parts by weight A) and 20 to 70 parts by weight B), most particularly preferably 40 to 75 parts by weight A) and 25 to 60 parts by weight B) (in each case referred to 100 parts by weight of A+B).

Each of the graft rubbers A) and B) preferably have rubber content greater than 50 wt. %, particularly preferably greater than 55 wt. % and most particularly preferably greater than 58 wt. %, relative to the weight of the respective graft. The rubber content of graft polymer C) is preferably 3 to 50 wt. %, particularly preferably 5 to 30 wt. % and most particularly preferably 6 to 25 wt. % relative to the weight of graft rubber C).

Molding compositions according to the invention may furthermore contain as component D) at least one thermoplastic rubber-free polymer obtained by polymerization of at least one resin-forming vinyl monomer, preferably by polymerization of styrene and acrylonitrile in a weight ratio of 90:10 to 50:50 therebetween, wherein the styrene and/or acrylonitrile may be wholly or partially replaced by α-methylstyrene, methyl metacrylate or N-phenylmaleimide.

If a polymer according to component D) is additionally used, the amount is up to 100 parts by weight, preferably up to 80 parts by weight and particularly preferably up to 60 parts by weight (in each case referred to 100 parts by weight of A+B+C).

The compositions according to the invention may also contain further rubber-free thermoplastic resins that are not built up from vinyl monomers. These thermoplastic resins optionally being used in amounts of up to 1000 parts by weight, preferably up to 700 parts by weight and particularly preferably up to 500 parts by weight (in each case referred to 100 parts by weight of A+B+C+D).

The rubber a) present in latex form and used for the production of the graft rubber A) as well as the rubber b) present in latex form and used for the production of the graft rubber B) may be present in the form of lattice with a monomodal, bimodal, trimodal or multimodal particle size distribution.

Those combinations of graft rubbers A) and B) are preferred in which at least one of the rubber lattices a) and b) used in their production has a bimodal or trimodal particle size distribution.

Particularly preferred are those combinations of graft rubber A) and B) in which the rubber latex a) used in their production has a monomodal particle size distribution and the rubber latex b) used in their production has a bimodal particle size distribution, or in which the rubber latex a) used in their production has a monomodal particle size distribution and the rubber latex b) used in their production has a trimodal particle size distribution, or in which the rubber latex a) used in their production has a bimodal particle size distribution and the rubber latex b) used in their production has a bimodal particle size distribution, or in which the rubber latex a) used in their production has a bimodal particle size distribution and the rubber latex b) used in their production has a trimodal particle size distribution, or in which the rubber latex a) used in their production has a bimodal particle size distribution and the rubber latex b) used in their production has a monomodal particle size distribution.

Most particularly preferred are those combinations of graft rubbers A) and B) in which the rubber latex a) used in their production has a monomodal particle size distribution and the rubber latex b) used in their production has a bimodal particle size distribution, or in which the rubber latex a) used in their production has a bimodal particle size distribution and the rubber latex b) used in their production has a bimodal particle size distribution.

The mean particle diameters ($d_{50}$ value) of the monomodal, bimodal, trimodal or multimodal rubber lattices a) and b) used for the production of the graft rubbers A) and B) may vary within wide ranges. Suitable particle diameters are for example between 50 and 600 nm, preferably between 80 and 550 nm and particularly preferably between 100 and 500 nm.

Preferably the mean particle diameters ($d_{50}$) of the rubber lattices a) that are used are less than the mean particle diameters ($d_{50}$) of the rubber lattices b) that are used, and particularly preferably the mean particle diameters of the rubber lattices a) and b) that are used differ by at least 40 nm, most particularly preferably by at least 80 nm.

Suitable rubbers a) and b) present in latex form for the production of the graft rubbers according to component A) and component B) are in principle all rubber polymers having a glass transition temperature below 0° C. Examples of such rubber polymers are polydienes such as for example polybutadiene and polyisoprene, alkyl acrylate rubbers based on $C_{1-8}$ alkyl acrylates such as for example poly-n-butyl acrylate, and polysiloxane rubbers such as for example products based on polydimethylsiloxane.

Preferred rubbers a) and b) for the production of the graft rubbers A) and B) are butadiene polymer lattices, which may be produced by emulsion polymerization of butadiene. This polymerization process is known and is described for example in Houben-Weyl, Methoden der Organischen Chemie, Makromolekulare Stoffe, Part I, p. 674 (1961), Thieme Verlag Stuttgart. As comonomers there may be used up to 50 wt. %, preferably up to 30 wt. % (referred to the total amount of monomers used for the butadiene polymer production) of one or more monomers copolymerizable with butadiene.

Preferred examples of such monomers are isoprene, chloroprene, acrylonitrile, styrene, α-methylstyrene, $C_1$–$C_4$ alkylstyrenes, $C_1$–$C_8$ alkyl acrylates, $C_1$–$C_8$ alkyl methacrylates, alkylene glycol diacrylates, alkylene glycol dimethacrylates and divinylbenzene; preferably butadiene is used alone. In the production of a) and b) it is also possible to first produce a finely particulate butadiene polymer by known methods and then to agglomerate the polymer in a known manner in order to adjust the necessary particle size. Relevant techniques have been described (see EP-A 0 029 613; EP-A 0 007 810; DD-A 144 415; DE-A 12 33 131; DE-A 12 58 076; DE-A21 01 650; U.S. Pat. No. 1,379,391).

In principle the rubber lattices a) and b) may also be produced by emulsifying finely particulate rubber polymers in aqueous media (see JP-A 55-125 102).

For the production of rubber latex a) and/or b) with bimodal, trimodal or multimodal particle size distributions, monomodal rubber lattices of different mean particle size and narrow particle size distribution are preferably mixed with one another.

Monomodal rubber lattices with a narrow particle size distribution are understood within the context of the present invention to mean those lattices that have a particle size distribution width (measured as $d_{90}$–$d_{10}$ from the integral particle size distribution) of 30 to 150 nm, preferably of 35 to 100 nm and particularly preferably of 40 to 80 nm.

The differences in the mean particle diameters ($d_{50}$ from the integral particle size distribution) of the rubber lattices used for the mixture in the preferred production of bimodal, trimodal or multimodal particle size distributions are preferably at least 30 nm, particularly preferably at least 60 nm and most particularly preferably at least 80 nm.

Preferred are monomodal rubber lattices with a narrow particle size distribution produced by emulsion polymerization of suitable monomers, preferably butadiene-containing monomer mixtures, particularly preferably butadiene, according to the so-called seed polymerization technique, in which a finely particulate polymer, preferably a rubber polymer, particularly preferably a butadiene polymer, is produced as seed latex and is polymerized further into larger particles by further reaction with rubber-forming monomers, preferably with butadiene-containing monomers (see, for example, Houben-Weyl, Methoden der Organischen Chemie, Makromolekulare Stoffe Part I, p. 339 (1961), Thieme Verlag Stuttgart).

In this connection the polymerization is preferably carried out using the seed batch process or the seed feed process.

The gel contents of the rubber lattices a) and b) used for the production of the graft rubbers A) and B) are as a rule not critical and may vary within wide ranges. Normal values are between ca. 30 wt. % and 98 wt. %, preferably between 40 wt. % and 95 wt. % relative to the weight of the rubber.

Preferably the gel contents of the rubber latex a) that are used are higher than the gel contents of the rubber latex b) that are used, and particularly preferably the gel contents of the used rubber lattices a) and b) differ by at least 5%, most particularly preferably by at least 10%.

The gel contents of the rubber lattices a) and b) may be adjusted in a known manner by adjusting the reaction conditions (e.g. high reaction temperature and/or polymerization up to a high conversion as well as if necessary the addition of crosslinking substances in order to achieve a high gel content, or for example low reaction temperature and/or termination of the polymerization reaction before too high a crosslinking has taken place, as well as if necessary the addition of molecular weight regulators such as for example n-dodecylmercaptan or t-dodecylmercaptan in order to achieve a low gel content). As emulsifier there may be used conventional anionic emulsifiers such as alkyl sulfates, alkyl sulfonates, aralkyl sulfonates, soaps of saturated or unsaturated fatty acids as well as alkaline disproportionated or hydrogenated abietinic acid or talloleic acid; emulsifiers with carboxyl groups are preferably used (e.g. salts of $C_{10}$–$C_{18}$ fatty acids, disproportionated abietinic acid).

The mean particle diameter ($d_{50}$) as well as the $d_{10}$ and $d_{90}$ values may be determined by ultracentrifuge measurements (see W. Scholtan, H. Lange: Kolloid Z. u. Z. Polymere 250, pp. 782 to 796 (1972)). The values given for the gel content refer to the determination according to the wire cage method in toluene (see Houben-Weyl, Methoden der Organischen Chemie, Makromolekulare Stoffe, Part I, p. 307 (1961), Thieme Verlag Stuttgart).

The graft polymerization for the production of the graft rubbers A) and B) may be carried out in such a way that the monomer mixture is added in portions or continuously to the respective rubber latex a) or b) and is then polymerized.

In this connection special monomer: rubber ratios are preferably maintained.

In order to produce the graft rubber A) according to the invention, inorganic per salts selected from ammonium peroxodisulfate, potassium peroxodisulfate, sodium peroxodisulfate or mixtures thereof have to be used.

The reaction temperature in the production of the graft rubber A) according to the invention may vary within wide limits. The temperature is generally 25° C. to 160° C., preferably 40° C. to 100° C. and particularly preferably 50° C. to 90° C., the temperature difference between the start and end of the reaction being at least 10° C., preferably at least 15° C. and particularly preferably at least 20° C.

In order to produce the graft rubber B) according to the invention at least one suitable azo compound must be used as initiator.

Suitable azo compounds according to the invention are for example compounds of the formulae (I), (II), (III) and (IV):

(I)

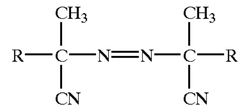

where R=$CH_3$, $C_2H_5$, $C_3H_7$, $C_4H_9$
wherein the isomeric radicals n-$C_3H_7$, i-$C_3H_7$, n-$C_4H_9$, i-$C_4H_9$, t-$C_4H_9$ are included (II)

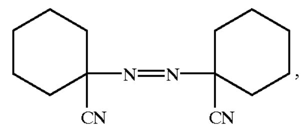

(III)

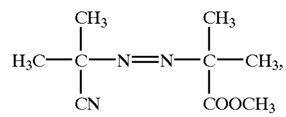

(IV)

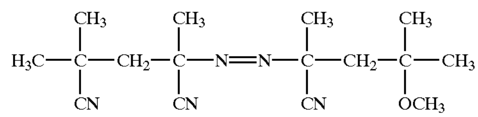

Preferred suitable azo compounds according to the invention are compounds of the formula (I), particularly preferably compounds (I) where R=$CH_3$, $C_2H_5$, $C_4H_9$.

The reaction temperature in the production of the graft rubber B) according to the invention may vary within wide limits. The temperature is in general 25° C. to 120° C., preferably 35° C. to 100° C. and particularly preferably 40° C. to 85° C., the temperature difference between the start and end of the reaction being at least 10° C., preferably at least 15° C. and particularly preferably at least 20° C.

In order to produce the graft rubber A) according to the invention preferably 20 to 60 parts by weight, particularly preferably 25 to 50 parts by weight, of at least one vinyl monomer, preferably a mixture of styrene and acrylonitrile, wherein the styrene and/or acrylonitrile may be wholly or partially replaced by α-methylstyrene, methyl methacrylate or N-phenylmaleimide, are polymerized in the presence of preferably 40 to 80 parts by weight, particularly preferably 50 to 75 parts by weight (in each case referred to solids) of a rubber latex a).

In order to produce the graft rubber B) according to the invention preferably 25 to 70 parts by weight, particularly preferably 30 to 60 parts by weight, of at least one vinyl monomer, preferably a mixture of styrene and acrylonitrile, wherein the styrene and/or acrylonitrile may be wholly or partially replaced by α-methylstyrene, methyl methacrylate or N-phenylmaleimide, are polymerized in the presence of preferably 30 to 75 parts by weight, particularly preferably 40 to 70 parts by weight (in each case referred to solids) of a rubber latex b).

The monomers used in these graft polymerizations are preferably mixtures of styrene and acrylonitrile in a weight ratio of 90:10 to 50:50 therebetween, particularly preferably in a weight ratio of 80:20 to 65:35.

In addition molecular weight regulators may be used in the graft polymerization, preferably in amounts of 0.05 to 2 wt. %, particularly preferably in amounts of 0.1 to 1 wt. % (in each case referred to the total amount of monomers in the graft polymerization stage).

Suitable molecular weight regulators are for example alkylmercaptans such as n-dodecylmercaptan, t-dodecylmercaptan; dimeric α-methylstyrene; terpinolene.

The production of the graft polymer C) is known (see for example DE-A 1 300 241, DE-A 2 659 175, EP-A 67 536, EP-A 103 657, EP-A 412 801, EP-A 505 798, U.S. Pat. No. 4,252,911, U.S. Pat. No. 4,362,850, U.S. Pat. No. 5,286,792 as well as the literature cited in these publications).

For example styrene and acrylonitrile may be polymerized in a weight ratio of 90:10 to 50:50 therebetween, preferably in a weight ratio of 65:35 to 75:25, wherein the styrene and/or acrylonitrile may be wholly or partially replaced by copolymerizable monomers, preferably by α-methylstyrene, methyl methacrylate or N-phenylmaleimide, in the presence of a soluble rubber according to known methods of solution, bulk or suspension polymerization.

Rubbers with a glass transition temperature of ≦10° C. are used; preferred are polybutadiene, butadiene/styrene copolymers (e.g. statistical copolymers, block copolymers, star copolymers), butadiene/acrylonitrile copolymers and polyisoprene.

Particularly preferred rubbers for the production of the graft polymer C) are polybutadiene and butadiene/styrene copolymers.

The rubber contents of the graft polymer C) according to the invention are 3 to 50 wt. %, preferably 5 to 30 wt. % and particularly preferably 6 to 25 wt. %.

The rubbers are present in the graft polymer C) in the form of rubber phases with mean particle diameters of ca. 100 nm up to above 10,000 nm; preferably ABS polymers are used with mean particle diameters of the rubber phase of 200 mm up to 5,000 mm, particularly preferably 400 nm up to 2,000 nm, especially 500 up to 1,500 nm.

As rubber-free thermoplastic resins D) preferably copolymers of styrene and acrylonitrile are used in a weight ratio of 95:5 to 50:50 therebetween, wherein the styrene and/or acrylonitrile may be wholly or partially replaced by α-methylstyrene, methyl methacrylate or N-phenylmaleimide.

Particularly preferred are copolymers D) with proportions of incorporated acrylonitrile units of less than 30 wt. %.

These copolymers preferably have weight-average molecular weight $\overline{M}_w$ of 20,000 to 200,000 and/or intrinsic viscosities [η] of 20 to 110 ml/g (measured in dimethylformamide at 25° C.).

Details of the production of these resins are described for example in DE-A 2 420 358 and DE-A 2 724 360. Vinyl resins produced by bulk or solution polymerization have proved particularly suitable. The copolymers may be added alone or in arbitrary mixtures.

Apart from thermoplastic resins built up from vinyl monomers it is also possible to use polycondensates, for example aromatic polycarbonates, aromatic polyester carbonates, polyesters or polyamides as rubber-free copolymer in the compositions according to the invention.

Suitable thermoplastic polycarbonates and polyester carbonates are known (see for example DE-A 1 495 626, DE-A 2 232 877, DE-A 2 703 376, DE-A 2 714 544, DE-A 3 000 610, DE-A 3 832 396, DE-A 3 077 934), and can be produced for example by reacting diphenols of the formulae (V) and (VI)

(V)

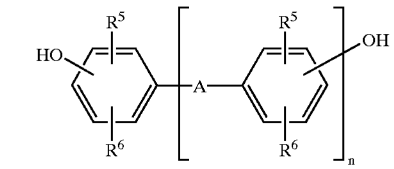

(VI)

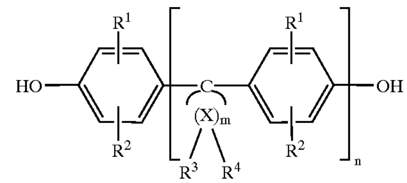

wherein

A denotes a single bond, $C_1$–$C_5$ alkylene, $C_2$–$C_5$ alkylidene, $C_5$–$C_6$ cycloalkylidene, —O—, —S—, —SO—, $SO_2$— or —CO, $R^5$ and $R^6$ independently of one another denote hydrogen, methyl or halogen, in particular hydrogen, methyl, chlorine or bromine, $R^1$ and $R^2$ independently of one another denote hydrogen, halogen, preferably chlorine or bromine, $C_1$–$C_8$ alkyl, preferably methyl, ethyl, $C_5$–$C_6$ cycloalkyl, preferably cyclohexyl, $C_6$–$C_{10}$ aryl, preferably phenyl, or $C_7$–$C_{12}$ aralkyl, preferably phenyl $C_1$–$C_4$ alkyl, in particular benzyl, m is an integer from 4 to 7, and is preferably 4 or 5, n is 0 or 1, $R^3$ and $R^4$ may be individually chosen for each X and independently of one another denote hydrogen or $C_1$–$C_6$ alkyl, and X denotes carbon, with carbonic acid halides, preferably phosgene, and/or with aromatic dicarboxylic acid dihalides, preferably benzenedicarboxylic acid dihalides, by interfacial polycondensation or with phosgene by homogeneous phase polycondensation (the so-called pyridine process), the molecular weight being able to be adjusted in a known manner by a suitable amount of known chain terminators.

Suitable diphenols of the formulae (V) and (VI) are for example hydroquinone, resorcinol, 4,4'-dihydroxydiphenyl, 2,2-bis-(4-hydroxyphenyl)-propane, 2,4-bis-(4-hydroxyphenyl)-2-methylbutane, 2,2-bis-(4-hydroxy-3,5-dimethylphenyl)-propane, 2,2-bis-(4-hydroxy-3,5-dichlorophenyl)-propane, 2,2-bis-(4-hydroxy-3,5-dibromophenyl)-propane, 1,1-bis-(4-hydroxyphenyl )-cyclohexane, 1,1-bis-(4-hydroxyphenyl)-3,3,5-trimethylcyclohexane, 1,1-bis-(4-hydroxyphenyl )-3,3-dimethylcyclohexane, 1,1-bis-(4-hydroxyphenyl)-3,3,5,5-tetramethylcyclohexane or 1,1-bis-(4-hydroxyphenyl)-2,4,4-trimethylcyclopentane.

Preferred diphenols of the formula (V) are 2,2-bis-(4-hydroxyphenyl)-propane and 1,1-bis-(4-hydroxyphenyl)-cyclohexane, and the preferred phenol of the formula (VI) is 1,1-bis-(4-hydroxyphenyl)-3,3,5-trimethylcyclohexane.

Mixtures of diphenols may also be used.

Suitable chain terminators are for example phenol, p-tert.-butylphenol, long-chain alkylphenols such as 4-(1,3-tetramethylbutyl)-phenol according to DE-A 2 842 005, monoalkyl phenols, dialkylphenols with a total of 8 to 20 C atoms in the alkyl substituents according to DE-A 3 506 472, such as p-nonylphenol, 2,5-di-tert.-butylphenol, p-tert.-octylphenol, p-dodecylphenol, 2-(3,5-dimethylheptyl)-phenol and 4-(3,5-dimethylheptyl)-phenol. The necessary amount of chain terminators is in general 0.5 to 10 mole % referred to the sum of the diphenols (V) and (VI).

The suitable polycarbonates and polyester carbonates may be linear or branched; branched products are preferably obtained by the incorporation of 0.05 to 2.0 mole %, referred to the sum of the diphenols used, of trifunctional or higher functionality compounds, for example those with three or more phenolic OH groups.

The suitable polycarbonates and polyester carbonates may contain aromatically-bonded halogen, preferably bromine and/or chlorine; however they are preferably halogen-free.

The polycarbonates and polyester carbonates have mean molecular weights ($M_W$, weight average) determined for example by ultracentrifugation or light scattering measurements, of 10,000 to 200,000, preferably 20,000 to 80,000.

Suitable thermoplastic polyesters are preferably polyalkylene terephthalates, i.e. reaction products of aromatic dicarboxylic acids or their reactive derivatives (e.g. dimethyl esters or anhydrides) and aliphatic, cycloaliphatic or arylaliphatic diols and mixtures of such reaction products.

Preferred polyalkylene terephthalates may be produced from terephthalic acids (or their reactive derivatives) and aliphatic or cycloaliphatic diols with 2 to 10 C atoms according to known methods (Kunstoff-Handbuch, Vol. VIII, p. 695 ff, Carl Hanser Verlag, Munich 1973).

In preferred polyalkylene terephthalates 80 to 100 mole %, preferably 90 to 100 mole % of the dicarboxylic acid radicals are terephthalic acid radicals, and 80 to 100 mole %, preferably 90 to 100 mole % of the diol radicals are ethylene glycol and/or butanediol-1,4 radicals.

The preferred polyalkylene terephthalates may in addition to ethylene glycol or butanediol-1,4 radicals also contain 0 to 20 mole % of radicals of other aliphatic diols with 3 to 12 C atoms or cycloaliphatic diols with 6 to 12 C atoms, for example radicals of propanediol-1,3,2-ethylpropanediol-1,3, neopentyl glycol, pentanediol-1,5, hexanediol-1,6, cyclohexanedimethanol-1,4,3-methylpentanediol-1,3 and 3-methyl-pentanediol-1,6,2-ethylhexanediol-1,3,2,2-diethylpropanediol-1,3, hexanediol-2,5, 1,4-di(β-hydroxyethoxy)-benzene, 2,2-bis-(4-hydroxycyclohexyl)-propane, 2,4-di-hydroxy-1,1,3,3-tetramethylcyclobutane, 2,2-bis-(3-β-hydroxyethoxyphenyl)-propane and 2,2-bis-(4-hydroxypropoxyphenyl)-propane (DE-A 2 407 647, 2 407 776, 2 715 932).

The polyalkylene terephthalates may be branched by incorporating relatively small amounts of trihydric or tetrahydric alcohols or tribasic or tetrabasic carboxylic acids, as described in DE-A 1 900 270 and in U.S. Pat. No. 3,692,744. Examples of preferred branching agents are trimesic acid, trimellitic acid, trimethylolethane and trimethylolpropane, and pentaerythritol. It is advisable to use not more than 1 mole % of the branching agent referred to the acid component.

Particularly preferred are polyalkylene terephthalates that have been produced solely from terephthalic acid and its reactive derivatives (e.g. its dialkyl esters) and ethylene glycol and/or butanediol-1,4, and mixtures of these polyalkylene terephthalates.

Preferred polyalkylene terephthalates are also copolyesters that have been produced from at least two of the aforementioned alcohol components; particularly preferred copolyesters are poly-(ethylene glycol butanediol-1,4)-terephthalates.

The preferably suitable polyalkylene terephthalates generally have an intrinsic viscosity of 0.4 to 1.5 dl/g, preferably 0.5 to 1.3 dl/g, in particular 0.6 to 1.2 dl/g, in each case measured in phenol/o-dichlorobenzene (1:1 parts by weight) at 25° C.

Suitable polyamides are the known homopolyamides, copolyamides and mixtures of these polyamides. These may be partially crystalline and/or amorphous polyamides.

Suitable as partially crystalline polyamides are polyamide-6, polyamide-6,6, mixtures and corresponding copolymers of these components. Also suitable are partially crystalline polyamides whose acid component consists wholly or partially of terephthalic acid and/or isophthalic acid and/or suberic acid and/or sebacic acid and/or azelaic acid and/or adipic acid and/or cyclohexanedicarboxylic acid, and whose diamine component consists wholly or partially of m-xylylenediamine and/or p-xylylenediamine and/or hexamethylenediamine and/or 2,2,4-trimethylhexamethylenediamine and/or 2,4,4-trimethylhexamethylenediamine and/or isophoronediamine, and whose composition is known.

Also suitable are polyamides produced wholly or partially from lactams with 7 to 12 C atoms in the ring, optionally used together with one or more of the aforementioned starting components.

Particularly preferred partially crystalline polyamides are polyamide-6 and polyamide-6,6 and their mixtures. Known products may be used as amorphous polyamides. These are obtained by polycondensation of diamines such as ethylenediamine, hexamethylenediamine, decamethylenediamine, 2,2,4-trimethylhexamethylenediamine, and/or 2,4,4-trimethylhexamethylene-diamine, m-xylylenediamine, and/or p-xylylenediamine, bis-(4-amino-cyclohexyl)-methane, bis-(4-aminocyclohexyl)-propane, 3,3'-dimethyl4,4'-diaminodicyclohexylmethane, 3-aminomethyl-3,5,5,-trimethyl-cyclohexylamine, 2,5-bis-(aminomethyl)-norbornane and/or 2,6-bis-(aminomethyl)-norbornane and/or 1,4-diaminomethylcyclohexane with dicarboxylic acids such as oxalic acid, adipic acid, azelaic acid, decanedicarboxylic acid, heptadecanedicarboxylic acid, 2,2,4-trimethyladipic acid, and/or 2,4,4-trimethyladipic acid, isophthalic acid and terephthalic acid.

Also suitable are copolymers that are obtained by polycondensation of several monomers, as well as copolymers that are produced in the presence addition of aminocarboxylic acids such as ε-aminocaproic acid, ω-aminoundecanoic acid or ω-aminolauric acid or their lactams.

Particularly suitable amorphous polyamides are the polyamides produced from isophthalic acid, hexamethylenediamine and further diamines such as 4,4'-diaminodicyclohexylmethane, isophoronediamine, 2,2,4-trimethyl hexamethylene-diamine and/or 2,4,4-trimethylhexa-methylenediamine, 2,5-bis-(aminomethyl)-norbornene and/or 2,6-bis-(aminomethyl)-norbornene; or from isophthalic acid, 4,4'-diaminodicyclo-hexylmethane and ε-caprolactam; or from isophthalic acid, 3,3'-dimethyl-4,4'-diaminodicyclohexylmethane and laurolactam; or from terephthalic acid and the isomeric mixture of 2,2,4-trimethylhexamethylenediamine and/or 2,4,4-trimethylhexamethylenediamine.

Instead of pure 4,4'-diaminodicyclohexylmethane there may also be used mixtures of the positional isomeric diaminodicyclohexylmethanes that consist of

| | |
|---|---|
| 70 to 99 | mole % of the 4,4'-diamino isomer |
| 1 to 30 | mole % of the 2,4'-diamino isomer |
| 0 to 2 | mole % of the 2,2'-diamino isomer, and |

optionally correspondingly higher condensed diamines that are obtained by hydrogenation of technical quality diaminodiphenylmethane. The isophthalic acid may be replaced in an amount of up to 30% by terephthalic acid.

The polyamides preferably have a relative viscosity (measured in a 1 wt. % solution in m-cresol at 25° C.) of 2.0 to 5.0, particularly preferably 2.5 to 4.0.

If in addition further rubber-free thermoplastic resins not built up from vinyl monomers are used, their amount is up to 1,000 parts by weight, preferably up to 700 parts by weight and particularly up to 500 parts by weight (in each case referred to 100 parts by weight of A)+B)+C)+D)).

Additives that are known in the art for their utility in thermoplastic molding compositions may be added to the compositions according to the invention. The addition may be during the production, processing, further processing and final forming. These additives include for example antioxidants, UV stabilisers, peroxide eliminators, antistatics, lubricants, mold release agents, flame retardants, fillers or reinforcing agents (glass fibers, carbon fibers, etc.) and coloring agents.

The production of the compositions according to the invention is carried out by mixing the components A)+B)+C) and the optional constituents in conventional mixing equipment (preferably in multiple roll mills, mixing extruders or internal kneaders).

The present invention accordingly furthermore provides a process for the production of the compositions according to the invention, in which the components A)+B)+C) and the optional constituents are mixed and then compounded and extruded at elevated temperature, in general at temperatures of 150° C. to 300° C.

Molding may be carried out in conventional processing units and includes for example injection molding, sheet extrusion optionally followed by thermoforming, cold forming, extrusion of pipes and profiled sections, and calendering.

EXAMPLES

In the following examples the specified parts are parts by weight and the specified % are % by weight unless otherwise stated.

Components Used

A) Graft rubbers produced using peroxodisulfate compounds as initiator:

A1) 70 parts by weight (calculated as solids) of a bimodal polybutadiene latex having a mean particle diameter $d_{50}$ of 244 nm (particle size peaks at 196 nm and 291 nm) and a gel content of 66 wt. % were adjusted with water to a solids content of ca. 20 wt. %. The latex was then heated to 59° C. and 0.45 part by weight of $K_2S_2O_8$ (dissolved in water) was added. 30 parts by weight of a monomer mixture (weight ratio of styrene:acrylonitrile=73:27), 0.08 part by weight of tert.-dodecylmercaptan and 1.0 part by weight (calculated as solid substance) of the sodium salt of a resin acid mixture (Dresinate® 731, Abieta Chemie GmbH, Gersthofen) dissolved in alkaline adjusted water, were then metered in parallel within 6 hours.

The reaction temperature was raised within 6 hours to 80° C., followed by a 2-hour post-reaction at this temperature. After adding ca. 1 part by weight of a phenolic antioxidant the reaction mixture was coagulated with a magnesium sulfate/acetic acid mixture and the resultant powder was washed with water and then dried at 70° C.

A2) The procedure described under A1) was repeated, except that 60 parts by weight (calculated as solids) of the polybutadiene latex described under A1), 40 parts by weight of monomer mixture (weight ratio of styrene:acrylonitrile=73:27) and 0.12 part by weight of tert.-dodecylmercaptan were used. The other amounts ($K_2S_2O_8$, sodium salt of a resin acid mixture) as well as the reaction and processing conditions remained the same.

B) Graft rubbers produced using azo initiators:

B1) 60 parts by weight (calculated as solids) of a bimodal polybutadiene latex having a mean particle diameter $d_{50}$ of 355 nm (particle size peaks at 291 nm and 415 nm) and a gel content of 65 wt. % were adjusted with water to a solids content of ca. 20 wt. %. The latex was then heated to 59° C. and 1 part by weight of the compound (I) where $R=C_2H_5$ (Vazo 67, DuPont Germany GmbH, Bad Homburg, obtainable from the manufacturer) dissolved in 10% of the monomer mixture was added. 40 parts by weight of a monomer mixture (weight ratio of styrene:acrylonitrile=73:27) and 0.12 part by weight of tert.-dodecylmercaptan were then metered in parallel within 6 hours, the temperature was raised to 80° C. during this period.

1.38 parts by weight (calculated as solid substance) of the sodium salt of a resin acid mixture (Dresinate® 731, Abieta Chemie GmbH, Gersthofen) were metered in in parallel to the monomers over a period of 6 hours.

After a 2-hour post-reaction time at 80° C., ca. 1 part by weight of a phenolic antioxidant was added, the mixture was coagulated with a magnesium sulfate/acetic acid mixture, and the resultant powder was washed with water and then dried at 70° C.

B2) The procedure described under B1) was repeated except that 60 parts by weight (calculated as solids) of a trimodal polybutadiene latex with a mean particle diameter $d_{50}$ of 298 nm (particle size peaks at 196 nm, 291 nm and 415 nm) and a gel content of 66 wt. % were used. The other amounts (monomers, initiator, emulsifier) as well as the reaction and processing conditions remained the same.

C) Graft rubbers produced by solution, bulk or suspension polymerization:

C1) Bulk ABS Magnum 3504 (Dow Chemical Europe S.A., Horgen, Switzerland).

Testing of the Molding Compositions

The polymer components described above were mixed in the proportions specified in Table 1 with 2 parts by weight of ethylenediamine bisstearylamide and 0.1 part by weight of a silicone oil in an internal kneader and after granulation into test specimens were processed into a flat sheet (in order to evaluate the surface and the contrast ratio, size 60×40×2 mm).

The following data were determined:

notched bar impact strength at room temperature ($a_k$(RT)) according to ISO 180/1A (unit: $kJ/m^2$), surface gloss according to DIN 67 530 at a reflection angle of 20° (reflectometer value), yellowness index (YI) according to ASTM Norm D 1925 (type of light: C, observer: 2°, measurement opening: large area value) according to the equation YI=(128X−106Z)/Y, where X, Y, Z=color co-ordinates according to DIN 5033, contrast ratio (CR) as a measure of the opacity of the material, obtained by measuring a sample against a black background and a white background and expressed as follows $$CR = \frac{Y(\text{against black background})}{Y(\text{against white background})} \times 100$$

where Y denotes the normal color value obtained from the CIElab color space with light type D 65 and 10° observer (see DIN 5033, Ulbricht sphere). The measurement was carried out using a Dataflash SF 600 plus CT spectrophotometer.

The processability of the molding compositions was evaluated by measuring the necessary filling pressure at 240° C. (unit: bar) (see S. Anders et al., Kunststoffe 81 (1991), 4, pp. 336 to 340 and literature cited therein). The results are summarised in Table 2.

From the table it is clear that the molding compositions according to the invention have significantly reduced opacity values and yellowness index (YI) values. Other important properties such as for example the notched impact strength or thermoplastic processability are likewise improved or are not adversely affected.

TABLE 1

Compositions of the tested molding compositions

| Example | A1 parts by weight | A2 parts by weight | B1 parts by weight | B2 parts by weight | C1 parts by weight |
|---|---|---|---|---|---|
| 1 | — | 5 | 5 | — | 90 |
| 2 | — | 10 | 10 | — | 80 |
| 3 | 4.3 | — | — | 5 | 90.7 |
| 4 | 8.6 | — | — | 10 | 81.4 |
| 5 (comparison) | — | 10 | — | — | 90 |
| 6 (comparison) | — | — | 10 | — | 90 |
| 7 (comparison) | — | — | — | — | 100 |

TABLE 2

Test data of the investigated compositions

| Example | $a_k$RT (kJ/m$^2$) | Filling Pressure (bar) | Gloss | YI | CR (%) |
|---|---|---|---|---|---|
| 1 | 38 | 220 | 62 | 22 | 73 |
| 2 | 42 | 225 | 60 | 24 | 76 |
| 3 | 40 | 218 | 75 | 21 | 73 |
| 4 | 43 | 222 | 62 | 25 | 75 |
| 5 (comparison) | 39 | 220 | 63 | 29 | 80 |
| 6 (comparison) | 35 | 236 | 42 | 26 | 77 |
| 7 (comparison) | 24 | 226 | 59 | 20 | 80 |

Although the invention has been described in detail in the foregoing for the purpose of illustration, it is to be understood that such detail is solely for that purpose and that variations may be made therein by those skilled in the art without departing from the spirit and scope of the invention except as it may be limited by the claims.

What is claimed is:

1. A thermoplastic molding composition comprising

A) at least one graft rubber that is the product of free-radical emulsion polymerization of at least one vinyl monomer in the presence of at least one rubber a) present in latex form having a glass transition temperature below 0° C. using at least one peroxodisulfate compound as initiator, B) at least one graft rubber that is the product of free-radical emulsion polymerization of at least one vinyl monomer in the presence of at least one rubber b) present in latex form having a glass transition temperature below 0° C. using at least one azo compound as initiator, C) at least one graft polymer that is the product of solution, bulk or suspension polymerization of styrene and acrylonitrile grafted phase in a weight ratio of 90:10 to 50:50 therebetween, in the presence of a rubber, wherein the rubber contains in copolymerized form 0 to 50 wt. % of a vinyl monomer and wherein the weight ratio of polymerized and grafted monomers to the rubber is 50:50 to 97:3.

2. The composition of claim 1 wherein the styrene and/or acrylonitrile of the grafted phase is at least partially replaced by a member selected from the group consisting of α-methylstyrene, methyl methacrylate and N-phenylmaleimide.

3. The composition according to claim 1 further containing a rubber-free thermoplastic vinyl polymer and/or a thermoplastic resin that contains no polymerized vinyl monomers.

4. The composition according to claim 3 wherein thermoplastic resin that contains no polymerized vinyl monomers is at least one member selected from the group consisting of aromatic polycarbonate, aromatic polyester carbonate, polyester and polyamide.

5. The composition according to claim 1 containing 1 to 50 parts by weight of the total of A) and B) and 50 to 99 parts by weight of C).

6. The composition according to claim 1 containing 2.5 to 45 parts by weight of the total of A) and B) and 55 to 97.5 parts by weight of C).

7. A thermoplastic molding composition comprising

A) at least one graft rubber that is the product of free-radical emulsion polymerization of styrene and acrylonitrile forming a grafted phase in a weight ratio of 90:10 to 50:50 therebetween in the presence of at least one butadiene rubber present in latex form, using at least one peroxodisulfate compound as initiator, B) at least one graft rubber that is the product of free-radical emulsion polymerization of styrene and acrylonitrile forming a grafted phase in a weight ratio of 90:10 to 50:50 therebetween, in the presence of at least one butadiene rubber present in latex form, using at least one azo compound as initiator, C) at least one graft polymer that is the product of solution, bulk or suspension polymerization of styrene and acrylonitrile forming a grafted phase in a weight ratio of 90:10 to 50:50 therebetween, in the presence of a rubber, wherein the rubber contains in copolymerized form 0 to 50 wt. % of a vinyl monomer and wherein the weight ratio of polymerized and grafted monomers to rubber is 70:30 to 95:5, and optionally, D) at least one thermoplastic rubber-free polymer that is the product of polymerization of styrene and acrylonitrile forming a copolymer in a weight ratio of 90:10 to 50:50 therebetween.

8. The composition of claim 7 wherein the styrene and/or acrylonitrile of at least one of the grafted phase, all occurrences the copolymer is at least partially replaced by a member selected from the group consisting of α-methylstyrene, methyl methacrylate and N-phenylmaleimide.

9. The composition according to claim 1 in which azo compound is at least one member selected from the group consisting of formulae (I), (II), (III) and (IV):

(I)

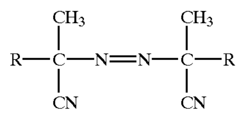

where R=$CH_3$, $C_2H_5$, n-$C_3H_7$, i-$C_3H_7$, n-$C_4H_9$, i-$C_4H_9$, t-$C_4H_9$ (II)

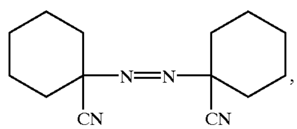

(III)

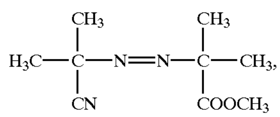

(IV)

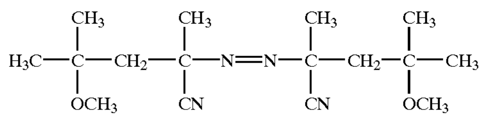

10. The composition according to claim 1 wherein the rubber lattices of A) and B) have monomodal particle size distributions.

11. The composition according to claim 1 wherein the rubber lattices of A) and B) have bimodal particle size distributions.

12. The composition according to claim 1 wherein the rubber latex of A) has a momodal size distribution and the rubber latex of B) has a bimodal particle size distribution.

13. The composition according to claim 1 wherein the rubber latex of A) has a momodal size distribution and the rubber latex of B) has a trimodal particle size distribution.

14. The composition according to claim 1 wherein the rubber latex of A) has a bimodal size distribution and the rubber latex of B) has a trimodal particle size distribution.

15. The composition according to claim 1 wherein the rubber latex of A) has a bimodal size distribution and the rubber latex of B) has a monomodal particle size distribution.

16. The composition according to claim 1 wherein the lattices of graft rubbers A) and B) have mean particle diameter of ($d_{50}$) of 50 to 600 nm.

17. The composition according to claim 1 wherein the lattices of graft rubbers A) and B) have mean particle diameter of ($d_{50}$) of 100 to 500 nm.

18. The composition according to claim 16 wherein the mean particle diameter ($d_{50}$) of the rubber latex of graft rubber A) is less than the mean particle diameter ($d_{50}$) of the rubber latex of the graft rubber B).

19. The composition according to claim 1 wherein the rubber latex of the component C) has a mean particle diameter of 100 nm to 10,000 nm.

20. The composition according claim 1 wherein the rubber of the component C) has a mean particle diameter of 200 nm to 5,000 nm.

21. The composition according to claim 1 wherein the rubber of the component C) has a mean particle diameter of 400 nm to 2,000 nm.

22. A method of using the composition of claim 1 comprising producing a molded article.

23. A Molded article comprising the composition according to claim 1.

* * * * *